(12) United States Patent
Hamed et al.

(10) Patent No.: US 10,577,435 B2
(45) Date of Patent: Mar. 3, 2020

(54) ETHYLENE GAS PHASE POLYMERISATION PROCESS

(71) Applicant: SABIC GLOBAL TECHNOLOGIES B.V., Bergen op Zoom (NL)

(72) Inventors: Orass M. Hamed, Riyadh (SA); Nayef M. Al-Enazi, Riyadh (SA); Vugar O. Aliyev, Riyadh (SA); Abderrahman Meddad, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 73 days.

(21) Appl. No.: 15/754,445

(22) PCT Filed: Jul. 27, 2016

(86) PCT No.: PCT/EP2016/067880
§ 371 (c)(1),
(2) Date: Feb. 22, 2018

(87) PCT Pub. No.: WO2017/032535
PCT Pub. Date: Mar. 2, 2017

(65) Prior Publication Data
US 2018/0194868 A1 Jul. 12, 2018

Related U.S. Application Data

(60) Provisional application No. 62/308,510, filed on Mar. 15, 2016, provisional application No. 62/308,505, filed on Mar. 15, 2016.

(30) Foreign Application Priority Data

Aug. 26, 2015 (EP) ..................................... 15182536
Nov. 2, 2015 (EP) ..................................... 15192544

(51) Int. Cl.
| | | |
|---|---|---|
| C08F 2/34 | (2006.01) | |
| C08F 10/02 | (2006.01) | |
| C08F 110/14 | (2006.01) | |
| B01J 21/06 | (2006.01) | |
| B01J 21/08 | (2006.01) | |
| B01J 23/26 | (2006.01) | |
| B01J 35/02 | (2006.01) | |
| B01J 35/10 | (2006.01) | |
| B01J 37/08 | (2006.01) | |
| B01J 37/02 | (2006.01) | |
| B01J 8/00 | (2006.01) | |
| B60K 15/03 | (2006.01) | |
| B01J 23/00 | (2006.01) | |

(52) U.S. Cl.
CPC .............. *C08F 2/34* (2013.01); *B01J 8/0015* (2013.01); *B01J 21/063* (2013.01); *B01J 21/08* (2013.01); *B01J 23/002* (2013.01); *B01J 23/26* (2013.01); *B01J 35/023* (2013.01); *B01J 35/1023* (2013.01); *B01J 35/1047* (2013.01); *B01J 37/0205* (2013.01); *B01J 37/088* (2013.01); *B60K 15/03* (2013.01); *C08F 10/02* (2013.01); *C08F 110/14* (2013.01); *B01J 37/0203* (2013.01); *B01J 2523/00* (2013.01); *C08F 2500/07* (2013.01)

(58) Field of Classification Search
CPC ... C08F 2/34; C08F 10/02; B01J 21/08; B01J 35/1023; B01J 35/023; B01J 23/26
See application file for complete search history.

(56) References Cited

U.S. PATENT DOCUMENTS

| | | | |
|---|---|---|---|
| 3,709,853 | A | 1/1973 | Karapinka |
| 3,779,712 | A | 12/1973 | Calvert et al. |
| 3,790,036 | A | 2/1974 | Miller |
| 4,003,712 | A | 1/1977 | Miller |
| 4,011,382 | A | 3/1977 | Levine et al. |
| 4,302,566 | A | 11/1981 | Karol et al. |
| 4,543,399 | A | 9/1985 | Jenkins, III et al. |
| 4,588,790 | A | 5/1986 | Jenkins, III et al. |
| 4,610,574 | A | 9/1986 | Peters |
| 4,774,299 | A | 9/1988 | Dumain et al. |
| 4,882,400 | A | 11/1989 | Dumain et al. |
| 5,195,654 | A | 3/1993 | Takakarhu et al. |
| 5,209,607 | A | 5/1993 | Wei et al. |
| 5,310,833 | A | 5/1994 | Kubo et al. |
| 5,352,749 | A | 10/1994 | Dechellis et al. |
| 5,453,471 | A | 9/1995 | Bernier et al. |
| 5,473,027 | A | 12/1995 | Batchelor et al. |
| 5,541,270 | A | 7/1996 | Chinh et al. |
| 5,738,249 | A | 4/1998 | Kikuchi et al. |
| 5,962,606 | A | 10/1999 | Williams et al. |
| 6,245,686 | B1 | 6/2001 | Agapiou et al. |
| 6,891,001 | B2 | 5/2005 | Kuhlburger |
| 7,122,607 | B2 | 10/2006 | Hagerty et al. |
| 7,300,987 | B2 | 11/2007 | Hagerty et al. |
| 7,915,357 | B2 | 3/2011 | Cann et al. |
| 8,846,834 | B2 | 9/2014 | Gao et al. |
| 9,611,342 | B2 | 4/2017 | Banat et al. |
| 2013/0144017 | A1 | 6/2013 | McDaniela et al. |

FOREIGN PATENT DOCUMENTS

| | | |
|---|---|---|
| EP | 0596111 A1 | 5/1994 |
| EP | 2322567 A1 | 5/2011 |

(Continued)

OTHER PUBLICATIONS

International Search Report for International Application No. PCT/EP2016/067880; International Filing Date: Jul. 27, 2016; dated Dec. 21, 2016; 7 Pages.

(Continued)

*Primary Examiner* — Catherine S Branch
(74) *Attorney, Agent, or Firm* — Cantor Colburn LLP

(57) ABSTRACT

The invention relates to a gas phase polymerisation process for the production of ethylene polymers in the presence of a catalyst composition based on a chromium compound, a titanium compound and a silica support material. The silica support material has a surface area (SA) between 685 $m^2/g$ and 800 $m^2/g$, a pore volume (PV) between 1.65 and 1.85 $cm^3/g$ and an average particle size in the range between 25 and 35 micrometres. The catalyst composition is injected by a dry catalyst feeder into the polymerization reactor.

13 Claims, No Drawings

(56) References Cited

FOREIGN PATENT DOCUMENTS

| JP | 4917426 | B2 | 4/2012 |
|----|---------|-----|---------|
| WO | 0187997 | A1 | 1/2001 |
| WO | 2008145601 | A1 | 12/2008 |
| WO | 2013159895 | A1 | 10/2013 |
| WO | 2013186025 | A1 | 12/2013 |

OTHER PUBLICATIONS

Machine Translation of JP4917426; Date of Publication: Apr. 18, 2012; 21 Pages.
Peacock, "Handbook of Polyethylene: Structures, Properties, and Applications," (2000) Marcel Dekker; pp. 43-66.
Pullukat, T.J., et al., "A Chemical Study of Thermally Activated Chromic Titanate on Silica Ethylene Polymerization Catalysts", Journal of Polymer Science: Polymer Chemistry Edition, vol. 18, 2857-2866 (1980).
Written Opinion of the International Searching Authority for International Application No. PCT/EP2016/067880; International Filing Date: Jul. 27, 2016; dated Dec. 21, 2016; 6 Pages.

ETHYLENE GAS PHASE POLYMERISATION PROCESS

CROSS REFERENCE TO RELATED APPLICATIONS

This application is a 371 of International Application No. PCT/EP2016/067880, filed Jul. 27, 2016, which claims priority to U.S. Ser. No. 62/308,510, filed Mar. 15, 2016 and 62/308,505, filed Mar. 15, 2016 and European Application Nos. 15192544.3 filed Nov. 2, 2015 and 15182536.1, filed Aug. 26, 2015 which are incorporated herein by reference in their entirety.

The invention is directed to gas phase polymerisation process for the production of ethylene polymers.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, chromium oxide based catalyst (Phillips catalysts) and single site catalysts. The various processes may be divided into solution polymerisation processes employing homogeneous (soluble) catalysts and processes employing supported (heterogeneous) catalysts. The latter processes include both slurry and gas phase processes.

The production of HDPE with gas phase processes is for example disclosed in U.S. Pat. No. 5,453,471, EP1285010B1, EP2322567A, EP1303546B, EP1907430B1 and U.S. Pat. No. 5,473,027.

U.S. Pat. No. 5,453,471 discloses a process for producing polymers in a stirred bed or gas fluidized bed reaction vessel having a polymerization zone containing a bed of growing polymer particles which comprises continuously introducing a stream comprised of one or more monomers and optionally one or more inert gases or liquids into said polymerization zone; continuously or intermittently introducing a polymerization catalyst into said polymerization zone; continuously or intermittently withdrawing polymer product from said polymerization zone; and continuously withdrawing unreacted gases from said polymerization zone, compressing and cooling said gases while maintaining the temperature within said polymerization zone below the dew point of at least one monomer present in said polymerization zone.

A chromium oxide based catalyst, which is commonly referred to in the literature as "the Phillips catalyst", can be obtained by calcining a chromium compound carried on an inorganic oxide carrier in a non-reducing atmosphere. The chromium oxide catalysis and the ethylene polymerisation with this specific catalyst are disclosed in "Handbook of Polyethylene" by Andrew Peacock at pages 61-64.

Pullukat et al. (Journal of Polymer Science; Polymer chemistry Edition; vol 18, 2857-2866; 1980) discloses thermally activated ethylene polymerisation catalysts which contain chromium and titanium on silica.

Catalyst systems based on chromium on silica support result in gas phase polymerisations in HDPE with a relatively broad molecular weight distribution (MWD) in the range between for example 10 and 12. With use of these catalysts polymers with different ranges of molecular weight can be produced depending on the temperature of the reactor.

It is a disadvantage of ethylene polymerisation catalysts based on chromium on silica support that there is a limitation in fluidised bed gas phase reactor polymerisation process in the case that polymers with low HLMI for example in the range of 2-6 are desired because to obtain these values the bed temperature has to be reduced to a temperature range between 89 and 93 degrees Celsius which results in a dramatically low catalyst productivity and economically unfeasible process.

It is the object of the present invention to provide a catalyst composition having a high activity in gas phase polymerisation processes while producing high-density polyethylene (HDPE) with a low HLMI which can be applied in the production of industrial bulk containers (IBC) and fuel tanks.

The catalyst composition used in the process according to the invention is based on a chromium compound, a titanium compound and a silica support material wherein the silica support material has a surface area (SA) $\geq 685$ m$^2$/g and $\leq 800$ m$^2$/g, a pore volume (PV) $\geq 1.65$ and $\leq 1.85$ cm$^3$/g and an average particle size in the range $\geq 25$ and $\leq 35$ micrometres.

According to a preferred embodiment of the invention the catalyst composition does not comprise a magnesium compound.

Preferably the silicon oxide support material has a surface area (SA) $\geq 700$ m$^2$/g.

Preferably the pore volume (PV) is $\geq 1.7$ cm$^2$/g.

Preferably the average particle size is $\geq 33$ micrometres.

The chromium loading of the catalyst is $\leq 0.7\%$ by weight, more preferably $\leq 0.5\%$ by weight.

The titanium loading of the catalyst ranges between 2 and 4% by weight.

The use of the catalyst according to the invention in a gas phase ethylene polymerization reactor at bed temperatures of $\geq 105°$ C. results in polyethylene with a high load melt index (HLMI) $\geq 2$ g/10 min and $\leq 10$ g/10 min. The HLMI is determined using the procedures of ASTM D-1238 Condition F using a load of 21.6 kg at a temperature of 190° C.

The catalyst according to the invention results in enhanced co-monomer incorporation. Suitable comonomers include butene and hexene.

According to a preferred embodiment of the invention the selected co-monomer is 1-hexene.

$M_w/M_n$ of the ethylene copolymer obtained with the catalyst according to the present invention ranges between $\geq 8$ and $\leq 15$ (according to size exclusion chromatography (SEC) measurement).

The density may range between a density $\geq 939$ kg/m$^3$ and $\leq 955$ kg/m$^3$ (according to ISO1183) and preferably ranges between $\geq 939$ kg/m$^3$ and $\leq 945$ kg/m$^3$.

The Izod impact strength (−30° C.) may range between $\geq 10$ KJ/m$^2$ and $\leq 50$ KJ/m$^2$ (according to ISO 180/A).

The resin bulk density may range between $\geq 450$ kg/m$^3$ and $\leq 520$ kg/m$^3$ (according to ASTM D-1895).

According to a further preferred embodiment of the invention the ethylene polymer has $M_w/M_n$ between $\geq 8$ and $\leq 15$ (according to size exclusion chromatography (SEC) measurement), density between $\geq 939$ kg/m$^3$ and $\leq 955$ kg/m$^3$ (according to ISO1183), Izod impact strength (−30° C.) between $\geq 10$ KJ/m$^2$ and $\leq 50$ KJ/m$^2$ (according to ISO 180/A) and resin bulk density between $\geq 450$ kg/m$^3$ and $\leq 520$ kg/m$^3$ (according to ASTM D-1895).

More preferably $M_w/M_n$ of the ethylene copolymer obtained with the catalyst according to the present invention ranges between $\geq 10$ and $\leq 15$ (according to size exclusion chromatography (SEC) measurement).

The catalyst preparation may take place by adding silica to a round bottom flask, equipped with a condenser and a mechanical stirrer dried under nitrogen purge. Next the chromium compound for example chromium acetate hydroxide is added to the silica and then slurried in for example methanol. Afterwards drying methanol solvent takes place with nitrogen purge. The dried chromium salt on silica powder is cooled down to room temperature and then slurried with for example iso-pentane, to be followed by the addition of the titanium compound for example tetra n-butoxy titanium, which is allowed to mix for example 30 minutes at 45° C. then drying the solvent at 95° C. with nitrogen purge. For the chromium catalyst activation the dried catalyst powder was placed in the calciner.

The chromium compound may be selected from various organic and inorganic forms of chromium. Preferably the chromium compound is selected from chromium acetate, chromium acetyl acetonate, chromium acetate hydroxide and chromium trioxide. Most preferably chromium acetate or chromium acetyl acetonate is applied.

The amount of chromium in the catalyst is between 0.2% and 0.7%, preferably between 0.2% and 0.5%. More preferably the loading ranges between 0.23% and 0.30%.

The titanium$^{4+}$ compound can be added to the unactivated chromium on silica catalyst followed by activation in dry air at temperature in order to convert Cr ($^{3+}$) to Cr ($^{6+}$). The presence of titanium increases the activity of the catalyst, first by shortening the induction time, and then by allowing higher polymerization rates. Furthermore, the presence of titanium may result in broadening the polymer molecular weight distribution (MWD) which can be useful in for example blow moulding applications.

Suitable examples of organic oxygen containing titanium compounds include alkoxides, phenoxides, oxyalkoxides, condensed alkoxides, carboxylates and enolates. A suitable organic oxygen-containing titanium compound is a titanium alkoxide. Suitable titanium alkoxy compounds include for example tetraethoxy titanium, tetramethoxy titanium, tetrabutoxy titanium, tetrapropoxy titanium, titanium tetraisopropoxide, tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride and mixtures thereof.

Preferred titanium compounds are tetra n-butoxy titanium and titanium tetraisopropoxide.

The titanium content of the catalyst ranges between 2.0 and 4.0% by weight.

According to a preferred embodiment of the invention the weight ratio Ti:Cr ranges between 4:1 and 5:1.

This ratio has to be selected depending of the desired end properties of the HDPE.

Chromium catalysts in the gas phase polymerization process may be supported on specific silica. In case a catalyst is supported on silica for example in the range between 25 and 35 micrometers there will be flowability deficiencies. Carrying the catalyst to the reactor by a dry catalyst feeder will be poor and will result in partial or complete pluggage in the catalyst delivery tube used to introduce the supported catalyst into the reactor. This pluggage phenomenon is particularly a problem when using high activity and high co-monomer incorporation catalyst.

The use of a catalyst feeder is disclosed in for example U.S. Pat. Nos. 3,777,9712, 6,245,868, 8,846,834 B2, EP 0596111, EP 0961784, U.S. Pat. Nos. 4,610,574, 5,195,654, 5,209,607, 4,774,299, 3,790,036, 5,738,249, JP 49-17426, WO 9201722 and WO2008145601.

HDPE produced with a gas phase polymerisation process with chromium catalysts with use of a dry catalyst feeder is unsuitable to be applied in the production of for example industrial bulk containers (IBC) because polymers with the desired relatively low HLMI (for example in the range between 2 and 10 g/10 min and more preferably in the range between 2 and 6) cannot be produced.

According to a preferred embodiment of the invention the polymerization of ethylene takes place in a gas phase polymerization in the presence of a catalyst composition comprising a silica support material wherein the catalyst is injected by a dry catalyst feeder into the polymerization reactor.

According to another preferred embodiment of the invention the polymerization of ethylene takes place in a gas phase polymerization in the presence of a catalyst composition comprising a silica support material wherein the catalyst is injected by a dry catalyst feeder into the polymerization reactor and wherein the silica support material has a surface area (SA) ≥685 m$^2$/g and ≤800 m$^2$/g, a pore volume (PV) ≥1.65 and ≤1.85 cm$^3$/g and an average particle size in the range ≥25 and ≤35 micrometres.

Preferably the catalyst composition is a dry catalyst composition.

The catalyst feeder injects finely divided solid catalyst into the polymerization reactor. The catalyst feeder may comprise a catalyst supply vessel, selected means for advancing a predetermined particle size of solid materials to the lower portion of the reservoir, metering means for metering predetermined amounts of solid materials selected by the selecting means to gas entrainment means and conduit means to deliver gas entrained solid material into a reaction chamber, the conduit means including a capillary tube having a specific inside diameter. Capillary tubes may have inside diameters of between for example 0.076 and 0.32 centimeters with preferred inside diameters between 0.076 and 0.23 centimeters. The preferred carrier gas inside the capillary tube is nitrogen. The carrier gas may have a flow rate of 1.7-2.2 kilograms per hour, preferably a flow rate of 1.8-2.0 Kg/hr.

The catalyst feeding system may optionally also comprise a pump.

The dry catalyst feeder generally comprises a loading tube/chamber which is connected to the polymerization reactor and which under positive gas pressure delivers a catalyst "plug" to the reactor zone.

The differential pressure may range between for example between 15 and 50 mbar.

The metal catalyst feeder may comprise a chamber having a mesh or screen and a metal plate (metering disk) with holes. The holes contains or leads to tubes which carries the dry catalyst into the polymerization reactor. The operation may be carried out under a nitrogen atmosphere and the dry catalyst is transferred to the reactor under positive nitrogen pressure.

The catalyst composition is first transferred to a catalyst reservoir, pressurized by high pressure purified nitrogen and transferred to the lower section through the screen. Then, the catalyst flows to the lower section which consists of the metal plate or disc where the catalyst starts filling the holes. Those holes keep rotating until they come into contact with a fixed hole that is connected to a pickup block passing the catalyst to the injection tube which transports the dry catalyst into the reactor.

The screen may be cleaned for example by use of a rotary brush.

According to a preferred embodiment of the invention the differential pressures through the catalyst feeder ranges between 15 and 50 mbar, more preferably between 25 to 35 mbar.

These pressures result in an optimisation of the catalyst feeder operating parameters to enable higher transfer rate of the catalyst to the reactor section by increasing the equalizing pressure over the catalyst feeder which results in an increase in the differential pressure between the catalyst feeder upper portion and the fluid bed reactor. Furthermore, an increase in the differential pressure between the bottom section of the feeder and the carrier gas, preferably nitrogen, is obtained. This improvement in differential pressure has led to enhancement in the catalyst flow ability and feeding rate which results in an improved reactor operation.

An equalizing valve provides a connection between the carrier gas supply and the catalyst reservoir to substantially equalize the pressure between the two locations during catalyst feeding. By significantly equalizing the pressure between the reservoir and the carrier gas supply, the pressure between the reservoir and the pickup section is controlled, and thus the pressure differential across the metering disk is controlled.

The process according to the invention improves the introduction of the catalyst to the reactor and as a result to improve reactor operation and continuity.

Mineral oil can be applied to transfer the catalyst from feeder to the reactor in fluidized bed reactor (gas-phase reactor) using catalyst of an average particle size between about 25 and 35 micrometers. Mineral oil is used to overcome the catalyst flowability deficiency.

According to a preferred embodiment of the invention no mineral oil is used.

Preferably the catalyst is metered by a metering device.

Preferably the catalyst is transferred more than two times through the metering device.

Preferably the metering design has more than two cavities.

There is no flushing because all catalyst is kept within the system.

Another advantage of the process according to the invention is increasing the superficial gas velocity (SGV) with increasing bed level, minimizing the product drop size by optimizing the product discharge system parameters in terms of changing nitrogen venting valve opening timing and product discharge tank pressure to protect the discharge system from damage. HDPE resin with very low HLMI for example less than 3.0 may contribute in harming the product discharge system.

The process according to the invention can be used in any polymerization process in a gas phase reactor.

The gas phase reactor may be any reactor suitable for gas phase polymerizations and may e.g. be vertically, horizontally mechanically agitated reactor or a fluidized bed reactor.

According to a preferred embodiment of the invention the reactor is a fluidized bed reactor.

In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomers flowing through the bed. Unreacted monomers and other optional gaseous components exit the fluidized bed and are contacted with a cooling system to remove this heat. The cooled gas stream, including monomer, comonomer and optional for example condensable liquids, is then re-circulated through the polymerization zone. Simultaneously, polymer product is withdrawn from the reactor. The reactor temperature in a gas phase process may range between for example 30° C. and 130° C. A description of a gas phase process is disclosed in for example U.S. Pat. No. 4,543,399 and U.S. Pat. No. 4,588,790.

Suitable fluidized bed reactors include for example a bubbling fluidized bed reactor, a circulating fluidized bed reactor, an annular fluidized bed reactor, a multi-zone fluidized bed reactor and a flash reactor. With 'fluidized bed' is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid. An example of a process using a fluidized bed for producing polyolefins is disclosed in U.S. Pat. No. 4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987.

The bottom of a fluidized bed reactor can for example comprise an inlet connected to a feeder for the reaction composition such as ethylene, nitrogen, hydrogen, comonomer, tri-isobutylamine amine and triethylaluminium.

The middle zone in the reactor above the distribution plate comprises an inlet for the polymerization catalyst that can be fed to the reactor in combination with nitrogen. The middle zone of the reactor also comprises an outlet to the product discharge tank. The top zone of the reactor comprises an outlet for a top recycle stream, wherein the outlet for the top recycle stream is connected to an inlet of the compressor. The compressor comprises an outlet for compressed fluids and the outlet of the compressor is connected to an inlet for compressed fluids of the cooling unit. The cooling unit comprises an outlet for providing a bottom recycle stream, which outlet of the cooling unit is connected to the inlet at the bottom of the reactor.

A suitable example of a multi-zone fluidized bed reactor (FBR) system is a multi-zone reactor operable in condensed mode, which multi-zone reactor comprises a first zone, a second zone, a third zone, a fourth zone and a distribution plate, wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone. This FBR can operate in a so-called "condensing mode" or "condensed mode" which is effective for removal of the heat produced during the exothermic polymerization. In this mode, heat removal is achieved by cooling the gaseous recycle stream to a temperature below its dew point, resulting in the condensation of at least a part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor and enables feeding of one or more very highly active catalysts. Details of an FBR which operates in a condensing mode are described for example in EP-A-13195141.

HDPE can be used to manufacture different types of industrial transit packaging such as large industrial open head drums, tight head drums, jerry cans, fuel tanks and intermediate bulk containers (IBC). The different types of storage and transit containers require different types of HDPE as the basic polymer because each type of industrial storage container requires an unique balance of impact resistance and ESCR properties and good processability properties.

In the development and the selection of the polymer there is typically a trade-off between characteristics such as resistance to slow crack growth (measured for example by ESCR), stiffness (measured for example by density) impact resistance (measured for example by Izod), chemical resistance and processability or more specifically ease of extrusion (measured for example by melt index). Typically the higher the molecular weight of polyethylene the higher the impact resistance and ESCR. However, increasing the molecular weight will decrease processability and make extrusion more difficult.

The end user and the governmental regulations require that the container meet certain minimum requirements, such as for example for impact resistance, top load, ESCR, chemical resistance, food approval and UN approval. Furthermore the producer of the containers expects ease of processability and material consistency. Depending on the end use, there may be even more specific requirements of the material. For instance, in the case of large drums and IBC manufactured by blow moulding, a high melt strength is generally desired, as the parison produced in the blow moulding process typically must maintain its integrity for longer periods of time as the object made gets larger. Each blow moulding application requires specific properties of the HDPE grades. For example, for food packaging organoleptic properties are important whereas environmental stress crack resistance and stiffness are important for detergent and cleaner applications. Industrial containers require chemical resistance and impact strength, especially when the containers are filled with products classified as dangerous goods under the UN recommendations recognising several types of packaging that can be used for the transport of dangerous goods:

Packages up to 400 kg or 450 l: for example jerry-cans, drums and fuel tanks,
Composite packages, inner and outer package fitting together: for example bag-in-box,
IBC's up to 3 m$^3$: for example flexible IBC, full plastic, composite steel outer cage with plastic inner receptacle.
Large packaging: from 400 kg or 450 l up to 3 m$^3$, for example pallet-box.

Plastic blow moulded IBC's or composite IBC's are multi-purpose, used both to transport and store products. They are widely used to transport liquids and viscous products, but also for pastes and powders. IBC's are available in a range of sizes from 500 to 1,500 litres wherein the 1,000-litre size accounts for the majority of demand. An IBC comprises four broad elements—bottle, cage (steel frame), parts (taps, valves, screw caps, gaskets, seals, corner inserts) and pallet (plastic, steel or wood). An IBC is used for transport and storage of fluids and bulk materials. The construction of the IBC and the materials used are chosen depending on the application, i.e. there are various types available in the market such as for example foldable IBC, plastic composite IBC and (stainless) steel IBC's. There are many advantages of the IBC concept because they are generally cubic in form and therefore can transport more material in the same area than cylindrically shaped containers and far more than might be shipped in the same space if packaged in consumer quantities. They rely on plastic liners that can be filled and discharged with a variety of systems. The manufacturer of a product can bulk package a product in one country and ship to many other countries at a reasonably low cost where it is subsequently packaged in final consumer form in accordance with the regulations of that country and in a form and language suitable for that country. The length and width of an IBC is usually dependent on the country's pallet dimension standard. IBC's may have pallet-like bases so that forklifts can move them. IBC in almost all cases can be stacked vertically. The focus for polymer development within this IBC market is to obtain an excellent processability and down gauging while maintaining a good balance in impact and ESCR properties.

The high density polyethylene grades obtained with the catalyst according to the invention result in intermediate bulk containers having an excellent balanced combination of processing properties, surface quality, welding quality, stiffness, ESCR and impact properties while maintaining the other desired properties.

WO2013186025 discloses a process for the gas phase polymerisation of ethylene in the presence of a catalyst composition comprising a support material carrying a chromium compound and a magnesium containing compound wherein the molar ratio chromium to magnesium ranges between 10:1 and 1:1. The support material is silica having a surface area (SA) ranging between 300 m$^2$/g and 500 m$^2$/g, a pore volume (PV) between 1.0 cm$^3$/g and 2.0 cm$^3$/g and a particle size between 30 and 90 micrometers. The magnesium compound comprising catalyst results in $M_w/M_n$ of 27 and 39. The magnesium compound was used to obtain very high Mw values and to produce very low HLMI.

WO2008145601 discloses a process for feeding a catalyst in a polymerization chamber. The catalyst is metered by a rotary valve, the catalyst is transferred one time with rotation of 180 degree, the metering design has two cavities and some of the catalyst is flushed way from the rotary valve system.

The invention will be elucidated by means of the following non-limiting examples.

EXAMPLES

The properties of the polymers produced in the Examples were determined as follows:

The high load melt index (HLMI) is determined using the procedures of ASTM D-1238 Condition F using a load of 21.6 kg at a temperature of 190° C.

The bulk density was measured according to ASTM D-1895.

Polymer molecular weight and its distribution (MWD) were determined by Polymer Labs 220 gel permeation chromatograph (GPC). The chromatograms were run at 150° C. using 1,2,4-trichlorobenzene as the solvent with a flow rate of 0.9 ml/min. A refractive index detector is used to collect the signal for molecular weights. The software used is Cirrus from PolyLab for molecular weights from GPC. The calibration of the HT-GPC uses a Hamielec type calibration with broad standard and fresh calibration with each sample set.

$M_w/M_n$ is determined according to size exclusion chromatography (SEC) measurement).

The density is determined according to ISO1183.

The Izod impact strength (-30° C.) is determined according to ISO 180/A.

Example I

Synthesis of Catalyst Composition

To a 3 L three-necked round bottom flask, equipped with a condenser and a mechanical stirrer 200 g of silica average particle size of 33 micrometers, a pore volume (PV) of 1.73 ml/g and a surface area (SA) of 705 m²/g dried at 150° C. for 3 hours under nitrogen purge (85 L/h). 4.5 g of chromium acetate hydroxide were added to the silica then slurried in 250 cm³ of methanol (99.9%), which was stirred at 70° C. for 30 minutes. Afterwards drying methanol solvent took place at 95° C. with nitrogen purge. The dried chromium salt on silica powder was cooled down to room temperature then slurried with 900 cm³ of iso-pentane, to be followed by the addition of 41 cm³ of 98.8% Ti(OC$_4$H$_5$)$_4$ (tetra n-Butoxy titanium) which was allowed to mix for 30 minutes at 45° C. then drying the solvent at 95° C. with nitrogen purge. For the chromium catalyst activation the dried catalyst powder was placed in the calciner and the following sequence was followed:

Ramp from ambient to 150° C. in 3 hours under N$_2$ flow then hold for 10 minutes
Ramp from 150° C. to 450° C. in 3 hours
At 450° C. switch from N$_2$ to O$_2$ flow
Ramp from 450° C. to 755° C. in 3 hours under O$_2$
Hold at 755° C. for 2 hours
Cool to 250° C. then switch to N$_2$ purge.
Elemental analysis: 0.55 wt % Cr and 2.1 wt % Ti
[Ti]:[Cr] Molar ratio=4.1

Example II

Ethylene Polymerization

An autoclave with a volume of 2 liters was purged with nitrogen at 130° C. for 30 minutes. After cooling the autoclave to 70° C., one liter of iso-pentane was introduced, then the reactor was pressurized with 15 bar ethylene.

Then 0.1 mmol of TEAL was injected into the reactor by the means of a catalyst injection pump. This was followed by injection of 0.2 g of catalyst composition according to Example I after being slurried in 20 cm³ of Iso-pentane solvent. The reactor temperature was raised to 103° C. Ethylene polymerization was carried out for 60 minutes; with ethylene supplied on demand to maintain the total reactor pressure at 20 bar.

498 liters of ethylene were consumed and 451 grams of polyethylene were recovered giving a catalyst productivity of 2,275 g PE/g cat h at 20 bar.

The characteristics of the obtained polyethylene:
weight average molecular weight: 300430,
number average molecular weight: 19005
molecular weight distribution: 15
HLMI=3.2
Density=954 kg/m³
Bulk density=405 kg/m³.
Fines level was measured at 1.5%.

NeoHookean fit Modulus: 33.5 MPa
Izod -30 C: 23.4 MPa
Charpy Impact: 8.1 kJ/m2
FNTC: 103 hrs Example III Synthesis of Catalyst Composition To a 3 L three-necked round bottom flask, equipped with a condenser and a mechanical stirrer 200 g of silica average particle size of 32 micrometers, a pore volume (PV) of 1.7 ml/g and a surface area (SA) of 705 m²/g dried at 200° C. for 3 hours. 4.3 g of chromium acetate hydroxide were added to the silica then slurried in 250 cm³ of methanol (100%), which was stirred at 70° C. for 30 minutes. Afterwards drying ethanol solvent took place at 85° C. with nitrogen purge. The dried chromium salt on silica powder was cooled down to room temperature then slurried with 250 cm³ of iso-pentane, to be followed by the addition of 39 cm³ of 100% Ti(OC$_2$H$_5$)$_4$ (tetra ethoxy titanium) which was allowed to mix for 30 minutes at 45° C. then drying the solvent at 75° C. with nitrogen purge. For the chromium catalyst activation the dried catalyst powder was placed in the calciner and the following sequence was followed:

Ramp from ambient to 150° C. in 3 hours under N$_2$ flow then hold for 10 minutes
Ramp from 150° C. to 450° C. in 3 hours
At 450° C. switch from N$_2$ to O$_2$ flow
Ramp from 450° C. to 759° C. in 3 hours under O$_2$
Hold at 759° C. for 3 hours
Cool to room temperature then switch to N$_2$ purge.
Elemental analysis: 0.35 wt % Cr and 2.9 wt % Ti Comparative Example A Synthesis of Catalyst Composition To a 3 L three-necked round bottom flask, equipped with a condenser and a mechanical stirrer 200 g of dried silica average particle size of 45 micrometers, a pore volume (PV) of 1.5 m³/kg and a surface area (SA) of 310 m²/g with 0.5% Cr at 200° C. slurried with 250 cm³ of iso-pentane, to be followed by the addition of 65 cm³ of tetraethoxy titanium Ti(OC$_2$H$_5$)$_4$ (100%). The contents were mixed at 35° C. for another 60 minutes followed by drying the solvent at 85° C. with nitrogen purge. For the chrome catalyst activation the dried catalyst powder was placed in the calciner and was activated in air at 825° C. for 4 hours. Elemental analysis: 0.5 wt % Cr and 3.8 wt % Ti Example IV Ethylene Polymerization:

Ethylene was polymerized in the presence of the catalyst according to Example III and Comparative Example A as described in Table 1 via a gas phase polymerisation system with reactor pressure: 20.7 bar, bed temperature up to 104° C., bed weight average of 50 kg; C$_2$ partial pressure: 15 bar; C$_6$/O$_2$ ratio 0.0008; H$_2$/C$_2$ ratio 0.16 and super gas velocity (S.G.V) 0.44 m/sec. The production rate was 12 kg/h and the catalyst productivity 12,500 kg/kg. The main characteristics of the obtained polyethylene:
Upper fluidized Bulk Density: 303 kg/m³
Resin Bulk Density: 453 kg/m³
HLMI: 3
Polymer Density: 951 kg/m³
Table 1 shows the HDPE from Example III and Comparative Example A.

TABLE 1

| | Catalyst from Comparative Example A | Catalyst from Example (III) |
|---|---|---|
| Ethylene Partial Pressure | 15 bar | 15 bar |
| $C_6/C_2$ Molar Ratio (1-Hexene) | 0.00125 | 0.0008 |
| $H_2/C_2$ | 0.16 | 0.16 |
| Bed Temperature | 90° C. | 104° C. |
| Bed Weight | 49 | 52 |
| Upper Fluidized Bulk Density | 252 | 303 |
| Production Rate | 10.2 | 12.3 |
| Catalyst Productivity | 10,000 | 12,500 |
| Superficial Gas Velocity | 0.44 m/sec | 0.44 m/sec |
| HLMI (21.6 kg) | 3.34 | 3.15 |
| Density | 953 kg/m³ | 951 kg/m³ |
| Ash | 99 ppm | 81 ppm |
| Resin Bulk Density | 401 kg/m³ | 453 kg/m³ |
| Fines % | 0.59% | 0.21% |

The catalyst according to the invention results in enhanced 1-hexene co-monomer incorporation by no less 33%. The catalyst results in increased resin bulk density, which caused an increase in bed weight and hence increased the drop size which caused an increase in the production rate.

The catalyst results in increase in the upper fluidized bulk density in gas phase reactor which gave room to increase the superficial gas velocity and hence increasing production rate and reducing carry over.

Another advantage is the superior spherical morphology resin with minimum amount of fines improving fluidization in gas phase reactors and reducing fouling effects.

Example V

Ethylene Polymerization

The catalyst as produced in Example 1 was used to produce high density polyethylene in a fluidized bed gas phase polymerization reactor. The fluidized bed gas phase polymerization reactor had an internal diameter of 45 cm and was operated with a 140 cm zone height. The catalyst was fed to the reactor using a dry solid catalyst feeder to maintain a production rate of 12 kg per hour. Ethylene, 1-hexene, hydrogen and nitrogen were introduced to the reactor to yield polymer with the required specifications. The reactor bed temperature was maintained at 105° C., ethylene partial pressure at 15 bar, total reactor pressure at 20.7 bar and superficial gas velocity at 0.43 m/s. Further process conditions are listed in table 2

TABLE 2

| Process parameter | Value |
|---|---|
| Total reactor pressure | 20.7 bar |
| Reactor bed temperature | 105° C. |
| Ethylene partial pressure | 15 bar |
| Ethylene fraction in feed gas | 75.6 vol % |
| Hydrogen fraction in feed gas | 73.66 vol % |
| 1-Hexene fraction in feed gas | 0.03 vol % |
| Bed weight | 50 Kg |
| Bed level | 34 mbar |
| FBD | 370 mbar |
| Superficial gas velocity | 0.43 m/s |
| Static | 0.007 kv |

The catalyst is added with a dry catalyst feeder had a speed of 21%, a nitrogen flow of 1.80 kg/hr, diff pressure 25 mbar and 6 metering disk holes. The material properties of the HDPE obtained from above Example were determined. The values are presented in table 3.

TABLE 3

| Property | Test method | Example 1 |
|---|---|---|
| Density (kg/km³) | ASTM D-792 08 | 954 |
| High-load Melt Index (HLMI) 21.6 kg/190° C. (g/10 min) | ASTM D-1238 10 | 2.6 |
| Melt Flow Rate (MFR) | ASTM D-1238 10 | 18.6 |
| Mn (g/mole) | ASTM D-6474 12 | 40,483 |
| Mw (g/mole) | ASTM D-6474 12 | 325,000 |
| MWD (g/mole) | ASTM D-6474 12 | 8.1 |
| Mz (g/mole) | ASTM D-6474 12 | 1.91 × 106 |
| Mz/Mw | ASTM D-6474 12 | 5.877 |
| Bulk Density (kg/m³) | ASTM D-6683 08 | 541 |
| Average particle size (mm) | ASTM D-1921 12 | 0.45 |
| Fines (%) | ASTM D-1921 12 | 0.2 |

The invention claimed is:

1. A gas phase polymerisation process for the production of ethylene polymers, comprising: polymerizing ethylene in the presence of a catalyst composition based on a chromium compound, a titanium compound and a silica support material characterized in that the silica support material has a surface area (SA) ≥685 m²/g and ≤800 m²/g, a pore volume (PV) ≥1.65 and ≤1.85 cm³/g and an average particle size in the range ≥25 and ≤35 micrometres, wherein the catalyst composition does not comprise a magnesium compound.

2. The process according to claim 1, wherein the surface area (SA) ≥700 m²/g.

3. The process according to claim 1, wherein the pore volume (PV) is ≥1.7 cm²/g.

4. The process according to claim 1, wherein the average particle size is ≥33 micrometres.

5. The process according to claim 1, wherein the catalyst composition is injected by a dry catalyst feeder into the polymerization reactor.

6. The process according to claim 1, wherein the catalyst composition is a dry catalyst composition.

7. The process according to claim 1, wherein the polymerization of ethylene takes place in a gas phase polymerization in the presence of a comonomer.

8. The process according to claim 7, wherein the comonomer is 1-hexene.

9. The process according to claim 1, wherein the ethylene polymer has high load melt index (HLMI) ≥2 g/10 min and ≤10 g/10 min (HLMI determined using the procedures of ASTM D-1238 Condition F using a load of 21.6 kg at a temperature of 190° C.)

10. The process according to claim 1, wherein the ethylene polymer has
   $M_w/M_n$ between ≥8 and ≤15 (according to size exclusion chromatography (SEC) measurement),
   density between ≥939 kg/m³ and ≤955 kg/m³ (according to ISO1183),
   Izod impact strength (−30° C.) between ≥10 KJ/m² and ≤50 KJ/m² (according to ISO 180/A) and
   resin bulk density between ≥450 kg/m³ and ≤520 kg/m³ (according to ASTM D-1895).

11. A gas phase polymerisation process for the production of ethylene polymers, comprising:
   injecting a catalyst composition with a dry catalyst feeder into a gas phase polymerization reactor; and
   polymerizing ethylene in the gas phase polymerization reactor in the presence of the catalyst composition;
   wherein the catalyst composition is based on a chromium compound, a titanium compound, and a silica support material, wherein the silica support material has a surface area (SA) ≥685 m²/g and ≤800 m²/g, a pore volume (PV) ≥1.65 and ≤1.85 cm$^3$/g and an average particle size in the range ≥25 and ≤35 micrometres; and wherein the catalyst composition does not comprise a magnesium compound.

12. The process according to claim 11, wherein the polymerizing is in the presence of 1-hexene.

13. The process according to claim 11, wherein the ethylene polymer has $M_w/M_n$ between ≥8 and ≤15 (according to size exclusion chromatography (SEC) measurement);

density between ≥939 kg/m$^3$ and ≤955 kg/m$^3$ (according to ISO1183);

Izod impact strength (−30° C.) between ≥10 KJ/m$^2$ and ≤50 KJ/m$^2$ (according to ISO 180/A); and resin bulk density between ≥450 kg/m$^3$ and ≤520 kg/m$^3$ (according to ASTM D-1895).

\* \* \* \* \*